May 13, 1941.　　J. G. JACKSON　　2,241,781
BAKING PAN
Filed Jan. 24, 1938

INVENTOR.
Joseph G. Jackson
BY Stanley Hoods
ATTORNEY.

Patented May 13, 1941

2,241,781

UNITED STATES PATENT OFFICE 2,241,781

BAKING PAN

Joseph G. Jackson, Oak Park, Ill., assignor to The Edward Katzinger Company, Chicago, Ill., a corporation of Illinois Application January 24, 1938, Serial No. 186,583

10 Claims. (Cl. 53—6)

This invention relates to an improved construction and assembly of a baking pan or the like having a stiffening frame enclosed by a flange extending from the edge of the pan.

It is an object of this invention to provide a baking pan or the like wherein the flanges of the pan and the stiffening frame enclosed thereby are provided with mutually deformed portions adapted to create an interlocked connection between said pan flanges and the stiffening frame.

With the above and other objects in view, as will be apparent, this invention consists in the construction, combination and arrangement of parts, all as hereinafter more fully described, claimed and illustrated in the accompanying drawing, wherein:

Figure 4:
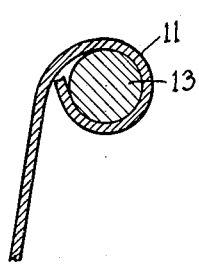
Fig. 4 is a similar section taken on line 4—4 of Fig. 2.

Reference being had more particularly to the drawing, 10 designates a baking pan of any suitable construction, having flanges 11 at the upper edges of the walls thereof adapted to be bent outwardly, downwardly and inwardly to create the beads at the edges of the pan walls as hereinafter more fully described. A stiffening frame 13, of wire or other suitable material is adapted to rest flush against the outer surface of the pan walls. As illustrated in Fig. 4, the flange 11 on the pan walls is bent over the frame 13 enclosing the latter and terminates between the inner lower extremities of the frame 13 and the wall of the pan.

It is to be understood that the stiffening member may be of one or more pieces. It is customary, however, to employ a single length of stock bent to conform with the peripheral contour of the pan edges, the ends of the stock meeting in approximate abutting relation. The ends of the stock are maintained in this position as long as the stiffening member is firmly engaged by the pan flange.

In order to establish an interlocked connection between said pan flanges 11 and the underlying wire frame 13, said flanges and frame are provided with indentations 14 preferably located in the underside region of the bead. As will be observed from Fig. 3, the indentations in the flange 11 is mutually arranged with the indentations in the frame 13, whereby the flange and frame are positively interlocked. Consequently, separation or loosening of the frame 13 from its engagement by the flange 11 is constantly opposed and resisted by this interlocked connection, and maintenance of the ends of the frame in proper relation to each other to effectively back up the pan edges under impact is assured.

Figure 1:
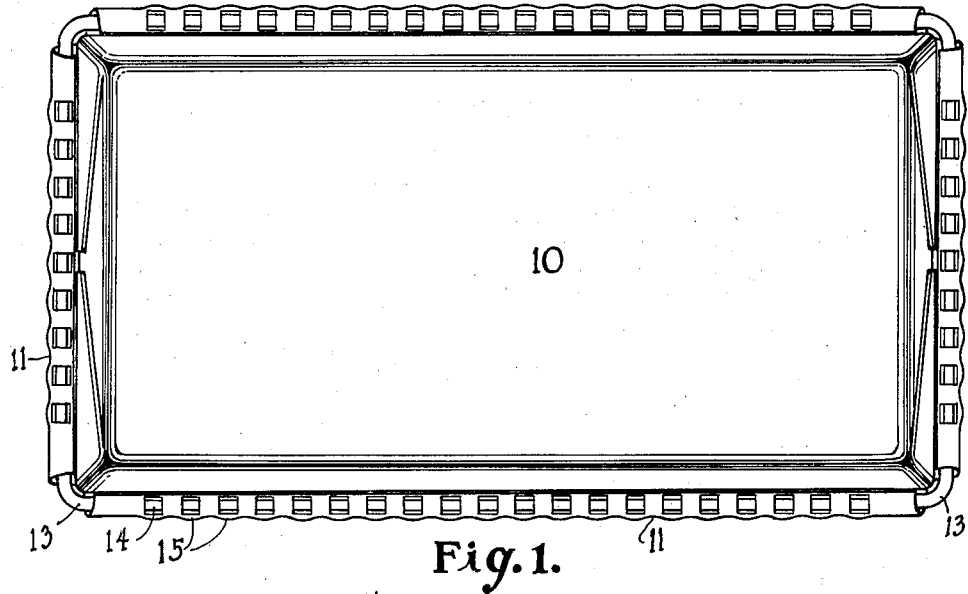
Fig. 1 is a bottom plan view of a bake pan constructed in accordance with the present invention.
Figure 2:
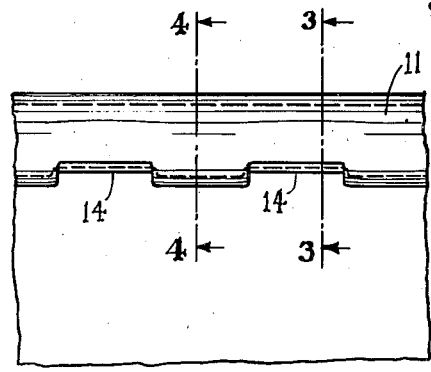
Fig. 2 is a fragmentary side elevation thereof.
Figure 5:
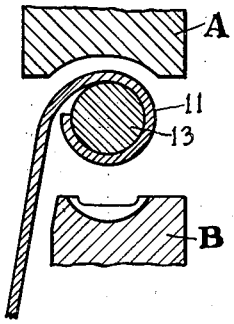
Figure 3:
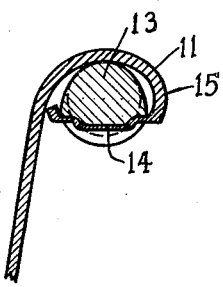
Fig. 3 is a vertical fragmentary section taken on line 3—3 of Fig. 2.

The connection between the pan flanges and the stiffening frame is further improved by means of mutually arranged lobes or protuberated portions 15 in said flange and frame members as shown in Fig. 3. As will be observed from Figs. 1 and 2, the indentations 14 and protuberated portions 15 create areas in the metal of the flange which are bulged away from the body of the frame 13 with the result that the metal of the flange is disposed throughout its length in alternating spaced relation and contact relation to the frame 13. By virtue of this corrugated-like arrangement of the outer edge of the flange 11, the adjacent edge of the pan is effectively strengthened to resist lateral blows.

What is claimed is:

1. The combination with a baking pan, a stiffening frame adjoining an upper edge thereof, a flange extending from said upper edge enclosing said frame to create a reinforcing bead, and mutually protuberated areas formed in said frame and flange.

2. The combination with a baking pan, a stiffening frame adjoining an upper edge thereof, a flange extending from said upper edge enclosing said frame to create a reinforcing bead, and mutually indented areas formed in said frame and flange.

3. The combination with a baking pan, a stiffening frame adjoining an upper edge thereof, a flange extending from said upper edge enclosing said frame to create a reinforcing bead, said frame and flange having portions thereof mutually displaced to develop laterally projecting lobes.

4. The combination with a baking pan, a stiffening frame adjoining an upper edge thereof, a flange extending from said upper edge enclosing said frame to create a reinforcing bead, said frame and flange having mutually indented areas in the underside region of the bead.

5. The combination with a baking pan, a stiffening frame adjoining an upper edge thereof, a flange extending from said upper edge enclosing said frame to create a reinforcing bead, said frame and flange having mutually indented areas in the underside region of the bead and mutually protuberated areas at a lateral edge thereof.

6. The combination with a baking pan, a stiffening frame adjoining an upper edge thereof, a flange extending from said upper edge enclosing said frame in varying spaced relation to the outer lateral edge of said stiffening frame.

7. The combination with a baking pan, a stiffening frame adjoining an upper edge thereof, a flange extending from said upper edge enclosing said frame in alternating spaced and intimate relation to said stiffening frame.

8. The combination with a baking pan having a flange extending from its edge, a frame comprising a length of wire of initially standard uniform dimension throughout its length and enclosed by said flange to create a reinforcing bead at the edge of the pan, and means through which said frame and said flange are interlocked including mutually indented areas formed in said flange and the frame enclosed thereby.

9. The combination with a baking pan, a frame adjoining an upper edge thereof having its ends arranged in substantially abutting relation to embrace the periphery of the pan, a flange extending from said upper edge of the pan enclosing said frame to create a reinforcing bead, and means through which said frame ends are locked against separating stresses including mutually indented areas formed in said frame and flange.

10. The combination with a baking pan, a frame adjoining an upper edge thereof having its ends arranged in substantially abutting relation to embrace the periphery of the pan, a flange extending from said upper edge of the pan enclosing said frame to create a reinforcing bead, and means through which said frame ends are locked against separating stresses including mutually indented areas formed in the underside of said frame and the portion of the flange overlying said underside of the frame.

JOSEPH G. JACKSON.